United States Patent [19]
Hansson

[11] Patent Number: 5,979,359
[45] Date of Patent: Nov. 9, 1999

[54] ANALYSIS OF COLOR TONE IN IMAGES FOR USE IN ANIMAL BREEDING

[75] Inventor: Jens Hansson, Skarpskyttevägen, Sweden

[73] Assignee: Alfa Laval Agri AB, Tumba, Sweden

[21] Appl. No.: 09/065,106

[22] PCT Filed: Oct. 24, 1996

[86] PCT No.: PCT/SE96/01368

§ 371 Date: Apr. 24, 1998

§ 102(e) Date: Apr. 24, 1998

[87] PCT Pub. No.: WO97/15901

PCT Pub. Date: May 1, 1997

[30] Foreign Application Priority Data

Oct. 27, 1995 [SE] Sweden .................................. 9503790

[51] Int. Cl.$^6$ .............................. A01J 5/013; A01J 5/007
[52] U.S. Cl. .................................. 119/14.08; 119/14.01; 119/14.14
[58] Field of Search .............................. 119/14.01, 14.1, 119/14.18, 174, 14.08, 712, 14.14, 14.24; 54/1, 71; 348/649, 679

[56] References Cited

U.S. PATENT DOCUMENTS

| | | | |
|---|---|---|---|
| 4,682,211 | 7/1987 | Kaji | 358/41 |
| 4,718,089 | 1/1988 | Hayashi et al. | 382/17 |
| 5,083,198 | 1/1992 | Haferl et al. | 358/32 |
| 5,450,500 | 9/1995 | Brett | 382/162 |
| 5,474,085 | 12/1995 | Hurnik et al. | 128/774 |
| 5,552,827 | 9/1996 | Maenaka et al. | 348/266 |
| 5,666,903 | 9/1997 | Bull et al. | 119/14.01 |
| 5,691,779 | 11/1997 | Yamashita et al. | 348/645 |

FOREIGN PATENT DOCUMENTS

| | | | |
|---|---|---|---|
| 0 267 860 | 5/1988 | European Pat. Off. | G06K 9/46 |
| 0 349 019 | 1/1990 | European Pat. Off. | A01K 1/12 |
| 0 567 191 | 10/1993 | European Pat. Off. | A01K 1/12 |
| 44 20 254 | 1/1995 | Germany | G06K 9/00 |
| 44 19 395 | 12/1995 | Germany | G06T 7/40 |
| WO 94/12020 | 6/1994 | WIPO | A01J 7/00 |

OTHER PUBLICATIONS

International Search Report.
International Search Report (citing 0567191).
International Search Report (citing 0349019).

*Primary Examiner*—Michael J. Carone
*Assistant Examiner*—Son T. Nguyen
*Attorney, Agent, or Firm*—Fish & Richardson P.C.

[57] ABSTRACT

The present invention relates to a method and a device in animal breeding for recording information on individual animals and/or collectives of animals which are within a defined area of residence, one or more video cameras being used to record video signals including image information from the animal or animals, and monitoring, position and/or positioning data being extracted from the recorded image information, comprising: analyzing the recording image information in respect of this pixel related content of one or more color tones being characteristic of one or more animals and/or one or more defined portions and/or states thereof; examining, in the analysis, the color content of the pixels in respect of its pertinent to one or more predefined color tone volumes; and calculating the data on the basis of pixels whose color content falls within the one or more predefined color tone volumes.

48 Claims, 5 Drawing Sheets

ANALYSIS OF COLOR TONE IN IMAGES FOR USE IN ANIMAL BREEDING

TECHNICAL FIELD

The present invention relates to a method and a device in animal breeding for recording information on individual animals and/or collectives of animals which are within a defined area of residence, one or more video cameras being used to record video signals containing image information from the animal or animals, and monitoring, position and/or positioning data being extracted from the recorded image information. The invention also relates to use of the method and the device according to the invention in connection with the supervising, foddering and milking of cows. Especially, the invention relates to a method and a device at a milking station for extracting position information on the teats of an animal for guiding an animal-related device.

BACKGROUND ART

In animal breeding, there is a general ambition to use technology for automation of various operations, such as foddering, milking, for the purpose of reducing the staff requirement and, consequently, keeping the costs down. At the same time, such technical equipment is required that the qualities in animal breeding can be maintained or improved. The technology used should also be possible to manufacture and service at costs that would make it applicable not only in large-scale breeding, but also in small and medium-size animal breeding plants.

A common requirement is that it should be possible to identify and/or determine the position of individual animals, collectives of animals, as well as defined parts of animals, e.g. to be able, when foddering, to portion the correct amount of fodder, correctly composed, or to be able to establish the position of the udder and teats of a cow at a milking station.

The problem in identifying cows in the first place has been solved by providing each individual with a so-called transponder which contains ID information on the cow and can be read as the cow passes defined interrogation stations. However, in a more general monitoring of stock of animals, there remains a wish to be able to determine the position as well as, where appropriate, identify both individual animals and collectives of animals without necessitating the provision of said transponders and the cows passing an interrogation station. For instance, this may involve the monitoring of animals moving freely in an enclosed pasture or cowhouse.

In many applications, great accuracy is required at the same time as the sensing should be able to take place at a great or small distance. This has resulted in methods and systems that are based on image information from the animals, the animal or portions of the animal, which is recorded by one or more video cameras. These cameras can be of conventional type and the image information can be recorded in black and white, but preferably the recording takes place in colour to permit the most accurate evaluation. The video cameras can be of the type operating with an electronic tube, but are preferably of the CCD type, having, for instance, the advantage of a smaller weight and a construction which, generally seen, is more durable. By using standard-type video cameras, the costs can be kept down, at the same time as it is possible to work with a well-developed technology.

Regarding milking and foddering, there are several motives for automated milking. Thus, one wants to reduce the staff requirement in order to keep the costs down and at the same time eliminate the ergonomically unsuitable operations in connection with milking. An automated milking procedure also makes it possible to increase the number of milking occasions a day, and to perform milking independently of the time of the day, which has been found to result in a considerably increased milk production.

Milking stations of the type in question are intended for cattle moving freely and finding the milking station on their own. During milking, the cow is standing in a stall which is closed by an automatically operated gate or like means, which makes the cow take a reasonably well defined position in the stall. In order to eliminate the risk of injuries, one strives to provide a quiet milking situation, which makes the cow stay fairly calm. This requires in turn that the milking procedure is carried out quickly and with great accuracy. Even under favourable conditions, one cannot expect the cow to stay quite calm in the stall, since there is a certain space for movements. Moreover, the individuals behave in different manners. This results in the udder and teats of the cow moving, which as a rule causes problems in the automatic application of teat cups and/or the guiding of other equipment in the context.

Generally seen, there are two main techniques of applying the teat cups: on the one hand at the same time as a milking means, where the teat cups are located in a holder with adjustable teat cup positions by a robot arm being raised towards the udder and, on the other hand, by applying the teat cups one by one to the respective teat by means of a guidable robot arm which collects the teat cups from a rack. Preferably the latter method is used since it allows greater flexibility and accuracy.

Prior art presents many attempts at solving the problem in the automatic application of teat cups. For instance, use has been made of sensors, e.g. IR sensors which sense, at a distance, the position of udder and teats in the horizontal plane, supplemented with additional sensors of the same or a corresponding kind, arranged on or adjacent each teat cup for accurately adjusting its position when the teat cup is raised towards the udder/teat. The experiments with this type of arrangement and the like have, however, not been satisfactory so far.

The development in this field has also led up to the suggestion of using image information, preferably colour image information, from one or more video cameras and subsequent image analysis for controlling the application of teat cups. The information content in a colour image is very great and thus provides the conditions for achieving the desired accuracy. The great amount of information is, however, in conflict with the demand for high speed information processing and accompanying excellent dynamics and precision in the system. Rapid processing of large data sets requires a great computer capacity, which in turn causes problems in manufacturing a technical installation at costs that can be defrayed by the expected savings. The computer power costs also render it difficult to develop a milking station which is suited not only for large-scale production but also for medium-size and small stock of animals.

An example of prior-art technique using video cameras for recording image information is to be found in GB-A-2,272,971, which discloses the use of two video cameras for recording colour image information at a milking station for the purpose of ascertaining whether the udder and teats of the cow are dirty or injured. This publication contains no detailed description of the processing of the image information, but it is established that colour images can be used and processed in real time, provided that a sufficient data processing capacity is available.

DE-37 44 867 C2 also discloses the use of video cameras at a milking station for applying teat cups to the cow's udder. The locating of a teat is intended to take place by so-called contour comparison between a significant contour characteristic of a teat, such as the tip thereof, in a recorded image and a reference contour. Nothing is said in this patent specification about the manner in which this significant contour information should be extracted from a recorded video image and how this significant contour information is then compared with a reference contour. This type of image or contour comparison usually implies large sets of data, thus necessitating a great data processing capacity. The use of the method at a milking station also requires that the image processing be carried out in real time, which further increases the demands for available data processing capacity.

The use of colour image information to achieve the greatest possible information accuracy consequently is in direct conflict with the demand that the technical installation involved should be possible to manufacture at costs that are acceptable in the situations of use. It is possible to get an idea of the data quantities involved by establishing that an image frame of the video information consists of two image fields, and that the field frequency is e.g. 50 Hz. From a current type of video camera, there is obtained for each field a data quantity consisting of 768*290 pixels (the number of pixels per line * the number of lines per field), where each pixel in turn contains 24 bits of colour information. If it is required that the processing of this data quantity occur in real time, i.e. within the recording time of the field, the available space of time is 20 ms, which corresponds to a processing speed of about 267 Mbit/s. Processors that are available today do not cope with this processing speed, especially if they are processors in so-called built-in systems, which are also required to manage input/output, have a moderate consumption of power and involve purchase costs that are reasonable in the context.

OBJECT OF THE INVENTION

An object of the invention is to provide an improved method device for processing animal related image data.

SUMMARY OF THE INVENTION

According to the invention, there is provided a method and a device in animal breeding for recording information on individual animals and/or collectives of animals which are within a defined area of residence, one or more video cameras being used to record video signals including image information from the animal or animals, and monitoring, position and/or positioning data being extracted from the recorded image information, comprising: analysing the recorded image information in respect of this pixel related content of one or more colour tones being characteristic of one or more animals and/or one or more defined portions and/or states thereof; examining, in said analysis, the colour content of said pixels in respect of its pertinent to one or more predefined colour tone volumes; and calculating said data on the basis of pixels whose colour content falls within said one or more predefined colour tone volumes.

It has been found that this concept mades it possible to significantly reduce the amount of time and memory capacity required for processing image data when recording information on animals and animal related features. Especially, this reduction of processing required enables real time processing of image information, thereby making it possible to control other animal related processes in real time as well. Furthermore, this processing can be accomplished by simpler and less expensive processors.

According to one advantageous aspect of the invention, there is provided a method and a device in animal breeding for recording information on individual animals and/or collectives of animals which are within a defined area of residence, one or more video cameras being used to record video signals containing image information from the animal or animals, and monitoring and/or position data being extracted from the recorded image information, wherein: the RGB signals included in the video signals are produced in digital form for the pixels in a frame or field of the video information; the digital RGB signals for the pixels are analysed in respect of their content of one or more colour tones which are characteristic of one or more animals and/or one or more defined portions and/or states thereof; each characteristic colour tone is identified by applying a pertainment function, the colour content of a pixel being tested for its pertainment to one or more colour tone volumes defined in advance and constituting one or more parts of a colour tone space formed by the colour intensities of the RGB signals; pixels are selected, whose colour content falls within a colour tone volume; and said data are calculated on the basis of the thus selected pixels.

The conversion of the RGB signals by using said pertainment function in fact results in a data reduction by the factor 3. In dependence on how well the searched characteristic colour tones are defined by said one or more colour tone volumes, a totally quite considerable data reduction can be achieved. When the RGB signals are analysed with respect to a characteristic colour tone represented by a well-defined colour tone volume, which may be the case when, for instance, one wants to decide whether one or more animals are staying within the defined area or not, implying that the characteristic colour tone selected for the animal/animals is to be distinguished from the colour tones of the surroundings, this processing of the image information can be sufficient to create the desired monitoring or positioning information.

For the description of the invention in the specification and claims, the RGB signals have been selected as the form of representation for the colour tone content of the image information, which can be said to imply that the colour information is related to a three-dimensional RGB colour tone space. However, it will be appreciated by those skilled in the art that it would just as well be possible for the colour content of the image information to be represented by corresponding luminance and chrominance signals, implying that the colour information is accounted for in polar form, and that measures corresponding to those defined in the claims can be defined for this mode of representation.

Preferably, every pixel within a colour tone volume is given a corresponding pertainment value which is indicative of the position of the pixel in the colour tone volume and, thus, is a measure of the relationship degree of the pixel.

By using these pertainment values, a further discrimination in the amount of data can be carried out, which according to the invention can take place by, for instance, setting a threshold, implying that merely pertainment values which are greater than a given threshold value are selected for the continued processing. An alternative or supplementary possibility of continued data reduction is averaging between pertainment values representing adjoining pixels along a line in the image information and excluding average values below a predetermined threshold value. One more possibility is to derive the pertainment values for the purpose of establishing changes between the pertainment values of adjoining pixels. By then maintaining merely derivative values above a certain size and discriminating the others, it is possible to isolate pixels lying in the edge zone between areas having conceivable differences in colour tone. For instance, this makes it possible to detect the contour of an object having a characteristic colour tone against a background. For example, it is possible to select pixels relating to probable teat edges or animal body edges and therefore having a great steepness/amplitude difference between adjoining pertainment values. A further processing possibility is the forming of average values of adjoining pertainment values and then discriminating average values below a threshold value.

By these supplementary measures, a drastic reduction of the amount of data is achieved, which renders it possible to obtain the desired information from the remaining data at a high processing speed while using a restricted processor capacity, for instance obtaining coordinates for portions of the observed animal.

A further increase of the final processing speed can be achieved by passing, for the reduced data set for relevant pixels, from so-called bitmap representation implying that pixels are processed at a constant frequency, to coordinate representation implying that merely for the relevant pixels, the associated x coordinates are processed along a image line, which requires that the relevant pixels be processed line by line and implies that the y coordinate can be considered known by the position of a current line in the image being known.

According to a the invention, said data reducing means are realised in a dedicated hardware, which is adapted to operate with a constant pixel delay and which comprises controllable delay means for compensation for a variable consumption of time for various selectable processing procedures, while said calculating means are adapted to measure the used calculating time. Preferably every colour tone volume is defined by a look-up table of pertainment values that are stored in a look-up memory unit, to which the RGB intensity values of the pixels are supplied as address information, the pertainment value for each pixel being read from the memory if the colour tone of the pixel is related to the colour tone volume defined by the look-up table or, alternatively, the pertainment value zero or the equivalent is given to the pixel if it falls outside said volume.

There are several advantages of performing the reduction by conversion from RGB signals into pertainment values in a hardware solution. Thus, it is possible to make a considerable saving of time in the processing compared with a processor-based software solution. Depending on the design of the software solution, the estimated saving of time may amount to a factor of about 200–1000. If the software solution is so designed that the conversion need not be carried out for all pixels in the image information, the saving of time can be estimated at a factor of 100. The use of a hardware solution also creates conditions of operating with a deterministic, constant pixel delay through the image analysing system in its entirety. This is of importance when using the method according to the invention in a dynamic system, e.g. for establishing the position coordinates for a moving object. Thus, knowing the pixel delay and having the use of a dynamic model for the "normal" movement pattern of the object, it is possible to predict the momentary position coordinates, thereby compensating for the delay and obtaining a truer account of the actual position.

According to a preferred embodiment of the invention, in which two spaced-apart video cameras are used for recording the image information, a further reduction of the amount of data can be achieved by illuminating the currently monitored object by means of two limited light beams of different colour, one light beam preferably containing light within the red colour spectrum, while the other light beam contains light within the blue colour spectrum; by directing said light beams to the object, such that the light beams are caused to intersect within an expected area of residence of the object, which has been predicted on the basis of historical data regarding the object; and by selecting only pixels containing colour contributions from the two light beams.

These measures enable discrimination of pixels which are related to a current colour tone volume, but which refer to objects both in front of and behind the expected area of residence of the object and will, as a result, only be illuminated by light of one of the colours and may consequently be discriminated for this reason. Even if the image information in itself is two-dimensional, discrimination in the third dimension is enabled in this manner, i.e. in depth relative to the direction of observation of the video cameras. This type of discrimination is particularly valuable when the image analysis aims at producing pixels that coincide with the contour of the object in surroundings where the object can be both concealed by and appear against the background of objects having the same or essentially the same colour tone as the object.

A device according to the invention for calculating monitoring and position data for individual animals and/or collectives of animals which are within a defined area of residence, comprises briefly one or more video cameras for recording image information from the area of residence, signal converting means for producing the digital RGB signals of the pixels, a data reducing unit having a pertainment function unit giving every pixel an associated pertainment value according to its content of an animal-characteristic colour tone, memory means for storing selected pixels, and calculating means for calculating said data on the basis of the selected pixels.

Preferably, according to the invention, use is made of a so-called look-up memory for accomplishing the pertainment function unit. The look-up memory is programmable with a look-up table of pertainment values defining the animal-characteristic colour tones.

It has been found possible, on the conditions that apply to the image information in connection with animal breeding, to develop colour-tone-based look-up tables which enable a far-reaching but yet well-balanced reduction of the data set.

According to a specific aspect of the invention, there are provided a method and a device at a milking station for extracting position information on the teats of an animal for guiding an animal-related device, one or more video cameras being used for recording image information from the udder, and data for calculating the position information being extracted by colour analysis of the image information, wherein: the digital RGB signals of the pixels in the recorded image information are generated; the number of pixels are reduced by analysis of the RGB signals with respect to the content of colour tones which are characteristic of the colour of the teats; the analysis comprises application of a pertainment function, which implies that the colour content of the pixels is tested for its pertainment to a limited colour tone volume, defined in advance, of teat colour tones in an RGB intensity space and is given a pertainment value corresponding to the positions of the pixels in or outside the colour tone volume; pixels having a colour tone that falls within the colour tone volume are selected as probable teat pixels, and the pertainment values of the selected pixels are used for continued processing and real time calculation of the positions of the teats.

Hence, the inveniton provides a method and a device which has been found to enable teat cup application with high performance in respect of accuracy, rapidity and dynamics.

One more possibility according to the invention of processing the pertainment values implies that one selects pixels in a given spaced-apart relationship and tests whether a teat edge transition can be imagined to occur between the elements, which may be carried out, for instance, by derivation or amplitude comparison. Subsequently, pairs of values are discriminated, for which such a transition could not be established. This method can be particularly usable in case of major image information interference.

Preferably, the data set can be further reduced by illumination of the teats with light beams of different colours from two directions and of such orientation that the light beams intersect adjacent the teats. By adaptation of the pertainment function, it is possible to limit the number of pixels/pertainment values to only such as contain colour contributions from both light beams. As a result, discrimination of pixels in "depth" of the recorded image is achieved, which may confer considerable advantages, for instance, when the position of a teat is to be established against a background of essentially the same colour tone, e.g. one hind leg of the cow.

An algorithm for determining the teats suitably starts from the teat tips, i.e. the analysis of the recorded frame/field should begin from below. This means that the analysis is delayed by the recording time for the frame/field, which in an imaginary case means 40 and 20 ms, respectively, since a video camera normally scans the image from the upper left corner to the lower right corner. Preferably, this delay can be eliminated by the video camera being arranged to scan the image from below and upwards and by continuously analysing the recorded image lines. This can readily be achieved by using one or more video cameras of standard type which are mounted upside-down. A continuous processing of the image information means that each field is analysed separately. The fields are interlaced, which means that the vertical resolution is halved compared with an analysis of a frame. Since the resolution in the vertical direction is uncritical for determining the positions of the teats, the deteriorated resolution can be ignored in favour of a saving of time of 20 ms, i.e. the reading time for a field.

A milking station according to the invention comprises animal-related means, which are guidable towards to the teats of an animal in dependence on position information for the teats, at least one video camera for recording image information from the teats and/or udder of the animal, and a device for extracting, by colour analysis of the image information, data for calculating the position information, and includes, for processing the video information, signal converting means, data reducing means, memory means, calculating means and control means, all having the detailed features that will appear from the claims.

The use of a pertainment function for limiting the amount of information in the manner described above has been found to satisfy the demands on rapidity and accuracy in the establishment of the teat position, independently of the significantly varying conditions at a milking station of the type involved. For instance, the light conditions may thus vary to a considerable extent, at the same time as the variations in teat colour can be very great between different animal individuals. This can be explained by the fact that the method using a pertainment function renders it possible to operate with more or less "diffusely" limited colour volumes, which increases the possibilities of identifying pixels of interest under varying conditions. By using a well-balanced look-up table of pertainment values, the amount of information can be reduced to a few per cent of the original amount.

By the term "milking station" is not meant that the station is exclusively usable for milking, but it can also be equipped with other functions. Thus, the station may be, for instance, a combined foddering and milking station, and also comprise other equipment for the cleaning and disinfecting of teats and udders.

Further embodiments of the method and the device according to the invention will be evident from the appended claims.

BRIEF DESCRIPTION OF THE DRAWINGS

The invention will be described in more detail with reference to non-restrictive embodiments as illustrated in the drawings, in which.

Equivalent elements in the various Figures have been provided with the same reference numerals.

DESCRIPTION OF EMBODIMENTS

For the sake of clarity, the following description will be directed in the first place to the milking of cows and the automatic application of teat cups. However, he usability of the invention is not restricted to merely milking procedures, but is just as well usable for guiding animal-related devices of different kinds or for different types of monitoring of animals and/or parts or states thereof in general, as will be described later.

Figure 1:
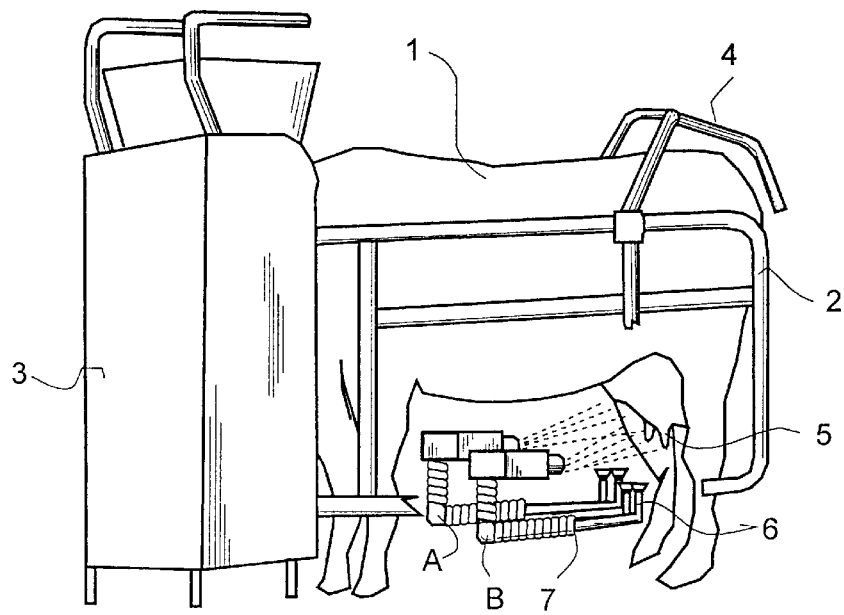
FIG. 1 shows a fundamental arrangement at a milking station according to a first exemplified embodiment of the invention.

With reference to FIG. 1, a cow 1 is standing in a milking and/or foddering station formed as a stall. The stall is formed of two equivalent lateral portions made of bars 2. The lateral portions are connected to a front stall part 3, in which foddering takes place. The rear part of the stall can be closed by an automatically vertically adjustable gate means 4, which in the lowered position as shown prevents the cow from moving backwards out of the stall. The gate means 4 is operated by a sensor (not shown) which is arranged in the stall and senses the cow's entering the stall.

Moreover, FIG. 1 shows two video cameras A and B, which are arranged in the same horizontal plane in a certain spaced-apart relationship and which are directed to record image information from the cow's udder and teats 5. Schematically shown teat cups 6 can be applied to the teats by means of a controllable robot arm 7.

The procedure is essentially as follows. When the cow 1 is correctly positioned in the stall, said sensor senses this and releases the lowering of the gate means 4. The video cameras A and B record image information from the teats 5, and information on the positions of the teats are prepared from the image information. This information is used for controlling the robot arm 7 and applying the teat cups 6.

As shown in FIG. 1, the cow is, during milking, shut up/kept in place in the stall by said gate means 4. It is therefore essential to carry out the application of the teat cups quickly and with maximum accuracy, thereby promoting a calm milking situation and reduced risks of injury.

It is pointed out that the mechanical design of the station is of no import to the invention and therefore is not shown in detail. In FIG. 1, the video cameras A, B are arranged on the same side of the cow and are both oriented to record image information from the teats obliquely from the front between the forelegs and hind legs of the cow. The use of two video cameras makes it possible to calculate all coordinates XYZ based on video information only.

Figure 2:
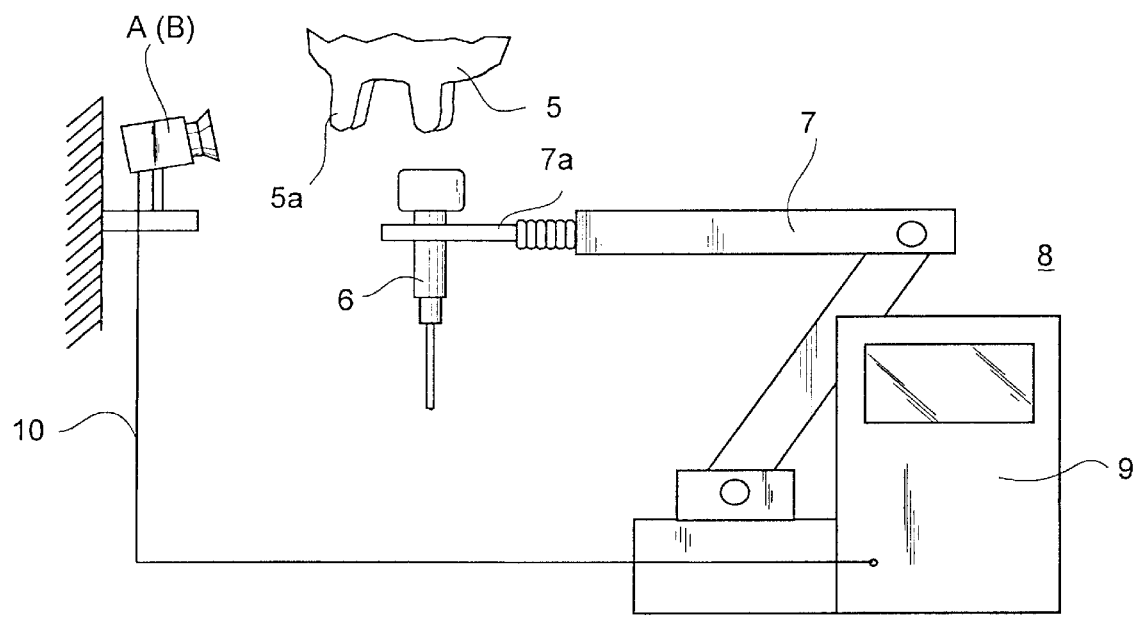
FIG. 2 shows parts of a technical installation at a milking station according to the invention, FIGS. 3a, b, c show alternative animal-related devices at a milking station according to the first embodiment of the invention.

The arrangement in FIG. 2 shows a milking robot 8 comprising the robot arm 7, which is operable horizontally, in depth and vertically and which at the very front is fitted with a gripping means 7a, and a computerised control device 9. The gripping means 7a supports a teat cup 6 which is to be applied to a teat 5. The robot is arranged to take out the teat cups 6 one by one from a teat cup rack (not shown). The Figure shows the video camera A of the two video cameras A, B in FIG. 1. The video camera B is imagined to be concealed by the camera A and positioned at a certain distance beyond this. The cameras A, B are directed to the teats 5 for recording image information from these. The video cameras A, B are connected to the control device 9 via the transmission line 10 for transferring the recorded image information.

The guiding of the robot arm 7 with the teat cup 6 takes place first of all with regard to the tip 5a of a teat 5. Based on the recorded image information from the video cameras A, B, the XYZ coordinates for the teat tip are calculated, and this coordinate information is used for controlling the robot arm 7. The XYZ coordinates are calculated by application of simple trigonometry and must be considered obvious. It has therefore not been found necessary to burden the present specification with a detailed account thereof. In this context, reference is instead made to the above-mentioned DE 37 44 867 C2.

In an alternative embodiment, at least one of the video cameras A, B can be arranged on a carrier, which in turn is supported by the robot arm 7. Such an arrangement creates possibilities of correcting a calculated teat position with regard to the dynamic properties of the robot arm.

The method according to this first embodiment of the invention can also be used to guide animal-related devices of some other kind than teat cups 6. FIGS. 3a, 3b, 3c show alternative animal-related devices. Thus, FIG. 3a shows a video camera 11 which can be moved, by the robot arm 7, towards the teats 5 in order to record close-up images thereof, for instance, for examining an injured udder and/or teat, dirtying thereof etc. FIG. 3b shows a spraying device 12 for the spraying of udder and teats, for instance, for the purpose of cleaning. FIG. 3c shows a cup 13 which is filled with iodine up to a suitable level, in which the teats are immersed when the milking is finished. Additional alternatives are conceivable, for instance, a teat cleaning device, comprising two counterrotating rollers between which the teat is caught and cleaned.

Figure 4:
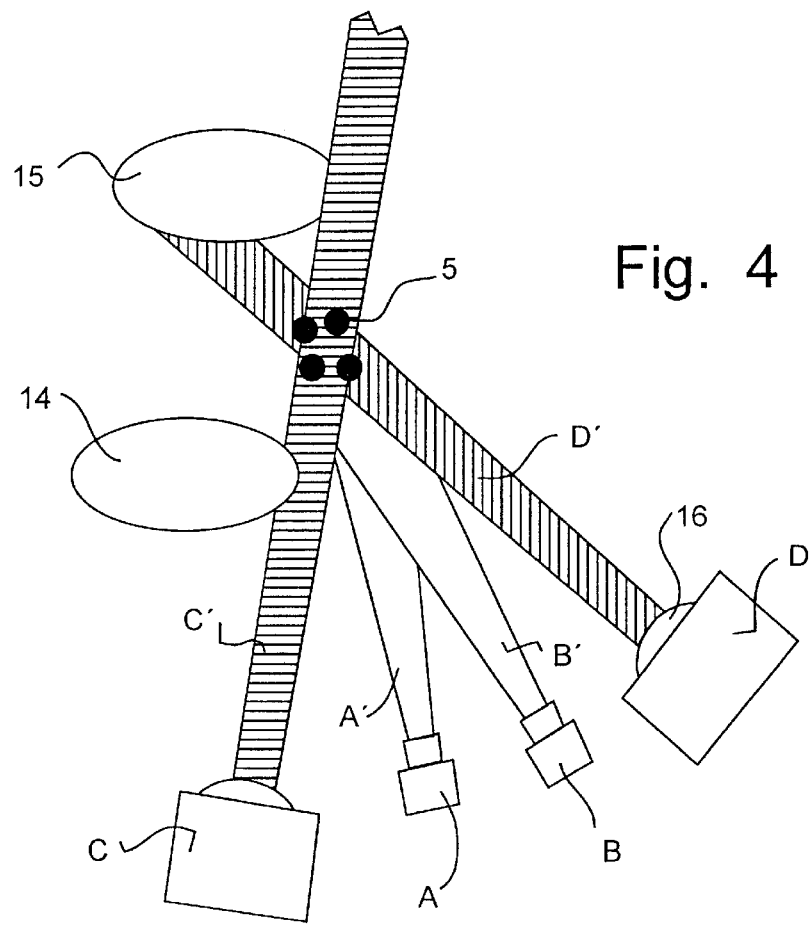
FIG. 4 is a top plan view of the fundamental arrangement when illuminating teats by differently coloured light sources in a milking station according to the first embodiment of the invention.

FIG. 4 is a schematic top plan view of an arrangement of the two video cameras A, B directed to the teats 5 indicated by circles. The video cameras have the visual fields A' and B', respectively. The hind legs of the cow are represented by the elliptic forms 14 and 15. As appears from the Figure, the cameras A and B also catch image information from the inside of the posteriorly situated leg 15. In the case where a corresponding portion of the cow's leg contains colour tones which are also characteristic of the teats 5 and which therefore are within the colour tone volume used for the data reduction, it may be difficult to distinguish "true" teat pixels from pixels relating the hind leg of the cow. This increases the amount of data and makes the calculation of the position information for the teats more difficult.

The difficulty is overcome by using two light sources C and D and their associated light-focusing means 16 for generating a directed light beam. The source C emits a red light beam C' to the expected area of residence of the teats 5, while the light source D emits a corresponding blue light beam to the same area. The light sources C and D are arranged, such that the light beams C' and D' intersect at a certain angle in the teat area. Posteriorly situated portions of the hind leg 15 are illuminated either by one or by the other light beam, but not by both light beams at the same time. Since the teats 5 are illuminated at the same time by both light beams, the "teat pixels" can be distinguished from the "hind leg pixels" by the look-up table, which defines the relevant colour tone volume, being given such a design that only pixels with colour contributions from both the red and the blue light beam fall within the colour tone volume, thereby making it possible to discriminate the remaining pixels. Even if the recording of images is in itself two-dimensional, a pixel discrimination is in this manner accomplished in the third dimension, i.e. in depth. The amount of information which is thus further reduced implies that the calculation of the position information will be accelerated and also will be more accurate.

Figure 5:
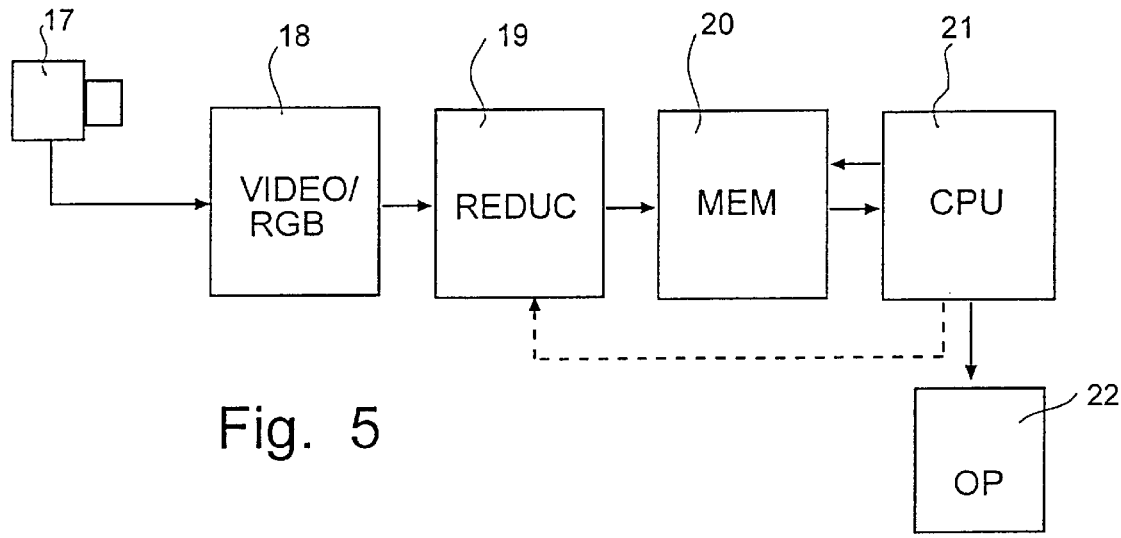
FIG. 5 is a block diagram of a image analysing device according to the invention.

The block diagram in FIG. 5 shows a video camera 17 which preferably is of the CCD type. In the block 18 (VIDEO/RGB), the analog video signal from the camera 17 is converted into digital RGB signals of the pixels of the fields. The digital RGB signals are supplied to a data reducing means 19 (REDUC), where the RGB signals of the pixels are analysed in respect of colour by using a pertainment function based on a look-up table. In the manner as will be described in more detail with reference to FIG. 6, the RGB signals of the pixels are converted into the corresponding pertainment values, and pixels satisfying the requirements of the pertainment function are selected. The pertainment values of the selected pixels are transmitted to a memory 20 (MEM), either directly or only after additional data reducing processing. On the basis of the pixel information in the memory 20, a central processing unit 21 (CPU) calculates, by means of selectable calculation algorithms, the desired monitoring, position and/or positioning data, which for example may be teat position information that is supplied to the milking robot 8 or animal behaviour information that is supplied to a operator monitor (not shown), here represented by a general operation block 22 (OP). It should be emphasised that the blocks 17–21 represent functions, which do not necessarily correspond to a corresponding division in their physical accomplishment.

The communication of the conventional analog video signal between the video camera 17 and the block 18 occurs through a coaxial cable. For the communication of control signals between the blocks 18 and 19, there is a standardised $I^2C$ bus, and for said digital RGB signals and the necessary clock and synchronising signals, there are dedicated data lines. From the data reducing block 19, the memory block 20 receives the pertainment values of a reduced number of pixels in a field or, alternatively, pertainment values after additional data reduction by derivation or averaging of the pertainment values and subsequent discrimination. There is also the possibility of supplying to the memory 20 pertainment values, derivatives or average values for merely pixels of interest, represented in coordinate form instead of bitmap form.

The memory 20 has capacity for storing the pixels in a field or, alternatively, a complete frame of the video information consisting of two interleaved and interlaced fields. The memory 20 has double input and output ports allowing the processor in the calculation block 21 to read information for already stored lines in the field, at the same time as information for subsequent lines is received from the block 19 for input or writing.

Figure 3:
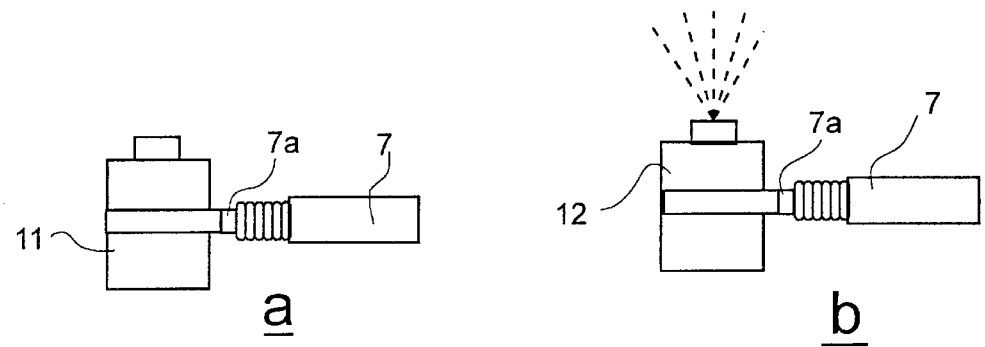
Figure 3:
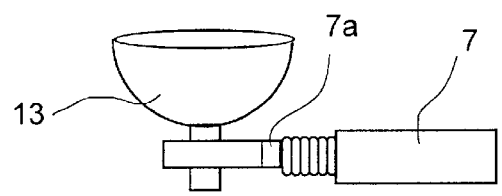

Monitoring, position and/or positioning data calculated in the block 21 are used for example for controlling a milking robot 22 (8) for guiding a teat cup or some other animal-related device according to FIG. 3. The calculated data may however be used for other purposes, such as for controlling an alarm transmitter in an operator-manned place or a control means for controlling other kinds of animal-related devices, incorporated in the general operation block 22, or for monitoring animal behaviour in general.

When using two or more video cameras, the inventive device comprises for each video camera the same set of functional blocks as in FIG. 5.

Figure 6:
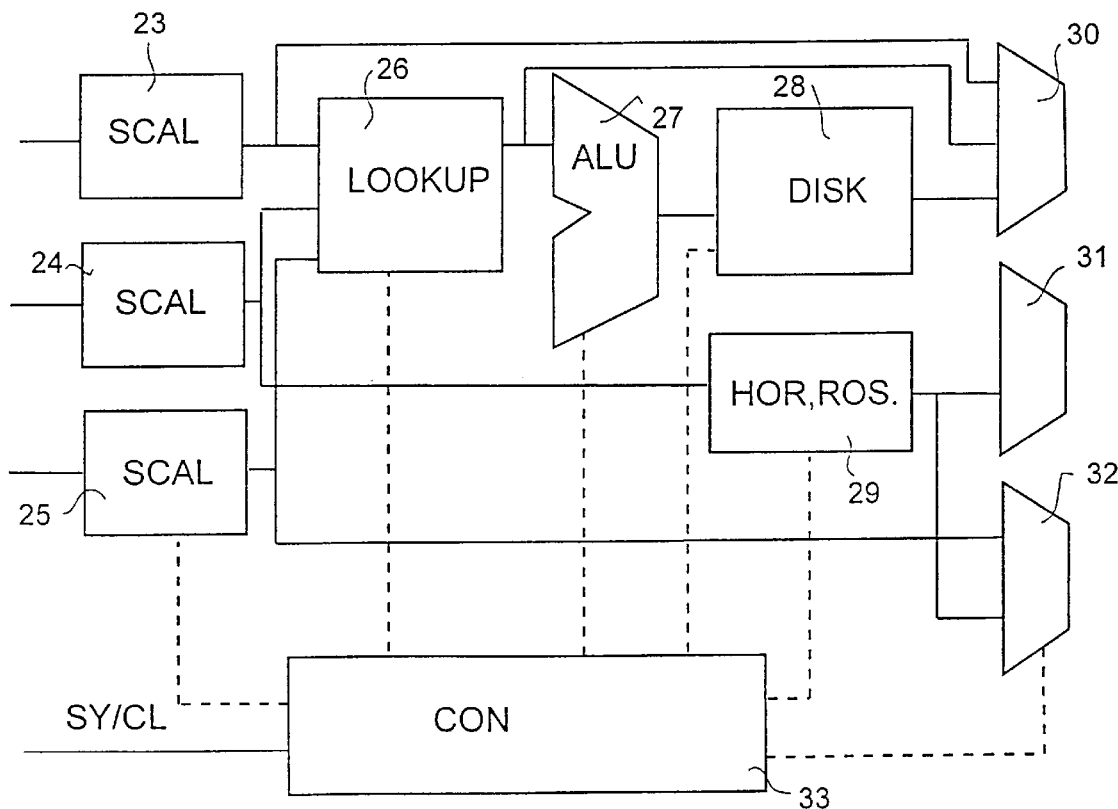
FIG. 6 is a block diagram of data reducing means included in the device according to FIG. 5.

FIG. 6 is a more detailed block diagram for said data reducing means 19 in FIG. 5. These have three inputs, designated R, G and B for the respective colour components in the RGB signals from the block 18. The input signals conform with standards and consist of so-called 8 bits RGB in 4:4:4 format and are generated by standard circuits in the block 2, which are well known to those skilled in the art. The current type of circuit is made by, for instance, Philips. Each input is provided with a scaling means 23, 24 and 25, respectively (SCAL). The function of the scaling means is to amplify the dynamics of the colour signals and simultaneously adapt the input signals to the address format for a subsequent look-up memory 26. To enable quick reprogramming of the look-up memory, the resolution has in the present case been limited to 5 bits per colour.

The output signals from the scaling means 23, 24, 25 are supplied on the one hand to the address inputs of the look-up memory 26 (LOOKUP) and, on the other hand, to the respective output multiplexors 30, 31, 32.

The look-up memory 26 is accomplished by a rapid static RAM memory. The look-up memory can be quickly reprogrammed with a look-up table of pertainment values, which is adapted to the situation of use, for instance, a look-up table defining a colour tone volume of colour tones which are characteristic of an individual animal or a group of animal or of specific features thereof such as the teats of an individual animal or a group of animals having a similar teat colour. The preparation of the pertainment values of the look-up tables will be described in more detail with reference to FIG. 8.

The output signal from the look-up memory 26 is a series of pertainment values of 8 bits, which means that the supplied three RGB signals of 8 bits each have been converted into a signal of 8 bits. In any case, a data reduction to ⅓ of the original amount of data has thus been performed by the look-up unit.

The output signal from the look-up unit 26 is supplied on the one hand to a calculating or counting unit 27 (ALU) and, on the other hand, to the output multiplexor 30. The calculation unit comprises means for deriving supplied pixel samples/pertainment values or performing averaging between adjoining samples. In a simplified embodiment, the deriving can be approximated to an establishment of the difference between adjoining samples. The calculation unit 27 is preferably implemented by a programmable circuit, which is reprogrammed for selecting the desired function. The output signal from the calculation unit 27 is supplied to a discriminator 28 (DISC), which serves to establish whether the processed signal from the calculation unit 27 is within or outside predetermined limit values and, based on this, decide whether the corresponding pixel data should be read into the memory 20. The output signal of the discriminator is supplied to the output multiplexor 30.

The block 29 (HOR.POS) represents a function for determining the horizontal position of a pixel of interest along a line in the field. This position is stored in the memory when a selected sample/derivative/average value is output from the discriminator 20. Since the Y coordinate of the pixel is known from the position of the line in the field and the memory position in the memory 20, the processor 21 gets access to the coordinates for these pixels of interest. When the pixel information is obtained via the discriminator, the information thus is transformed from bitmap form to coordinate form. In the embodiment shown, the output multiplexor 31 supplies one part of the horizontal position and the output multiplexor 32 the other part thereof.

The output multiplexors 30, 31, 32 are used to select output data for the memory 20. The following selections are possible: colour information of all picture elements or pixels is let through without processing by the output multiplexors 30, 31, 32 supplying the intensity values for red, green and blue directly from the associated scaling means 23, 24 and 25, respectively; the output multiplexor 30 supplies all pixels of the correct colour tone from the output of the look-up memory 26; the output multiplexor 30 supplies pertainment values after deriving or, alternatively, averaging for "pixels of interest", in which case the output multiplexors 31, 32 simultaneously supply said first and said second part of the horizontal position of the pixels.

For controlling the mode of operation, control means 33 (CON) are included, which receive a synchronising/clock signal (SY/CL) from the block 18 (FIG. 5) and generate control signals for all the included blocks 23–32, which has been indicated by dotted lines. By these control signals, the selection of said output data is controlled, as well as the selection of function in the calculation unit 27. Moreover, the programming of the look-up memory 26, the setting of the scaling means 23–25 and the selection of discrimination levels in the discriminator 28 are controlled. In reality, the control means are distributed within the shown configuration and are, in turn, controlled via feedback information from the processor in the block 21 (FIG. 5). In response to the result of the monitoring and position data, such as the teat position information, which is calculated therein and which, among other things, is dependent on light conditions when recording the image information and the general interference level thereof, the control means 33 are supplied with feedback information which can be used to control said selection of functions and settings in the blocks 23–32.

The configuration in FIG. 6 is arranged to operate with a constant pixel delay irrespective of the selected mode of operation. This is accomplished by a number of controllable D flip-flops (not shown), which delay the signals such that they always reach the outputs with the same consumption of time.

Figure 7:
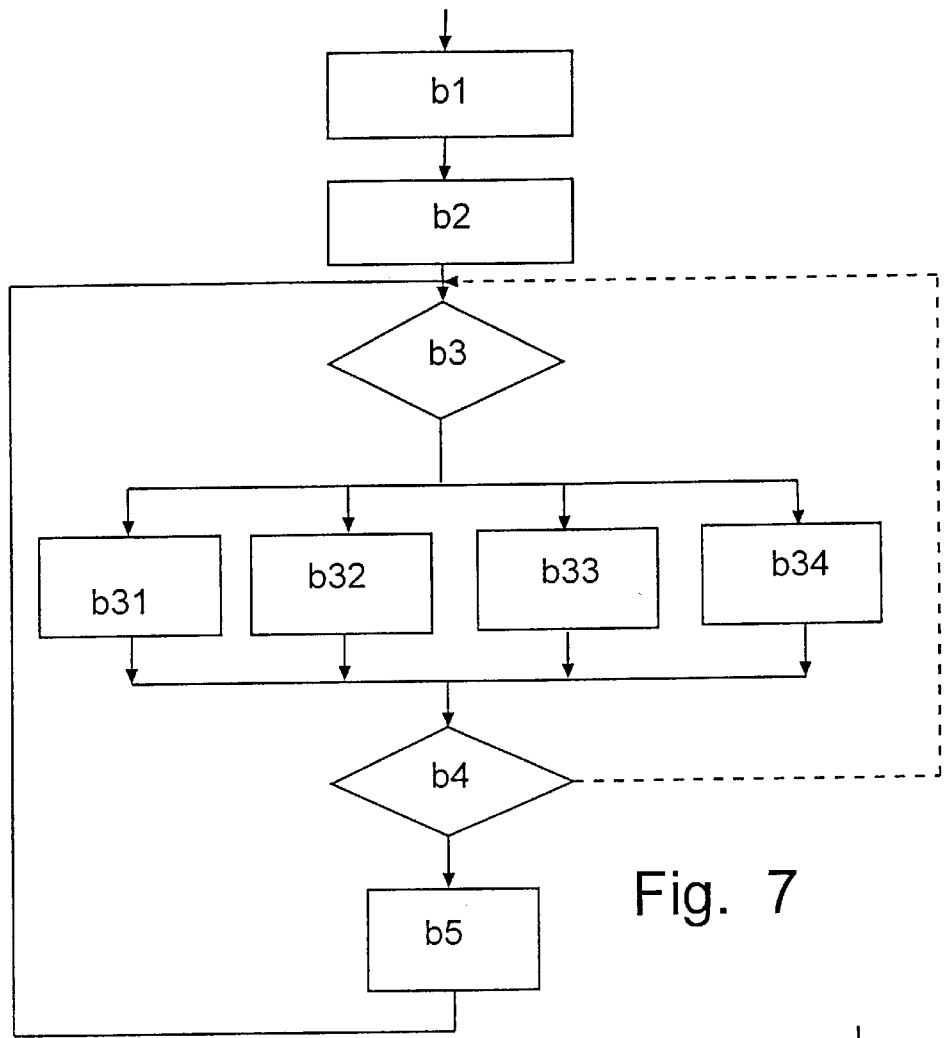
FIG. 7 is a flow diagram illustrating the overall mode of function of the device according to FIG. 5.

FIG. 7 shows the routine in the device according to the invention in an imaginary case of use for establishing a characteristic colour field in the area of residence, for example preparing the teat position information. The following steps are included:

b1. According to the circumstances in the area of residence, for example the milking stations, such as varying light conditions, the signal processing can be initiated with a background measurement, the result of which can be used for setting selectable functions and parameters.

b2. The look-up memory 26 is programmed with a suitable look-up table.

b3. Selection of function for the calculation unit 27 and the discriminator 28. The following selections are possible:

b31—Deriving of the pertainment values and subsequent discrimination; "pixels of interest" are advanced in coordinate form; used in case of minor signal interference and sharp edges of the colour field.

b32—Transparent mode with discrimination; the pertainment values are not processed in the calculation unit 27 but are level-discriminated in the discriminator 28 and advanced in coordinate form; used in case of minor signal interference and blurred edges of the colour field.

b33—Transparent mode and bitmap representation; the pertainment values are not processed in the calculation unit 27 and the discriminator 28; the values are advanced in bitmap form; used in case of moderate signal interference.

b34—Filtration and bitmap representation; the pertainment values are processed by averaging in the calculation unit 27 and advanced in bitmap form; used in case of major signal interference.

b4. On the basis of the pixel information selected under step b3 and supplied to the memory 20, the processor 21 tries to calculate occurrence of the colour field, for example the animal or teat position information, for instance, by establishing the position of the animals or the teat tip in the field by "calculation of centre of mass". Has it been possible to establish the colour field? If "yes" (Y), proceed to step b5; if "no" (N), the processor selects an alternative calculation algorithm or, alternatively, returns the information to step b3, thereby affecting the possibilities of selection in this step.

b5. The established colour field and, optionally, its position, such as the calculated teat position information, is supplied to the operational block 22 in FIG. 5. The procedure then returns to step b3 for processing the next field.

Figure 8:
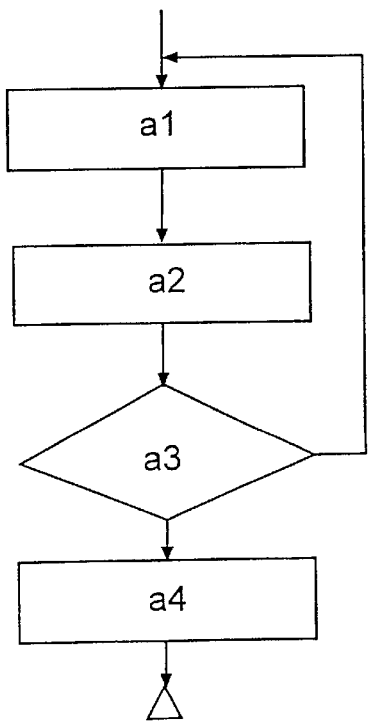
FIG. 8 is a flow diagram of the routine when calculating the pertainment values in a look-up table.

The flow diagram in FIG. 8 roughly shows the routine when preparing the look-up tables for programming of the look-up memory 26 in FIG. 6. A look-up table is generated based on a number of images of the features of interest, such as of animals in the area of residence or of the animal teats.

The following steps are included:

a1. Reading of an image.

a2. Marking of characteristic colour fields of the animals or portions thereof, such as the teats.

a3. Decision whether the material is sufficient for calculating a pertainment function. If "yes" (Y), proceed to the next step; if "no" (N), return to step a1 for reading a further image.

a4. Colour analysis of the images in respect of colour tones included and calculation of the corresponding pertainment values for preparing a look-up table of such pertainment values. The pertainment value for a certain colour tone can be calculated as, for instance, the relationship between the number of pixels within marked surfaces or colour fields containing the tone and the total number of pixels containing the tone. Finally, the colour tone volume defined by the generated look-up table can be given approximating border zones by supplementing with colour tones that are not to be found in the used image material.

In this manner, the required number of look-up tables for enabling programming of the look-up memory in dependence on the situation of use are prepared.

As is evident from that stated above, the described embodiment is directed to the use of two video cameras. However, it is also possible within the scope of the invention to use a single video camera for "roughly locating" an animal or a teat in the vertical and the horizontal direction by using the described image analysing technique, and then "finely locating" the object of interest also in depth by means of other equipment, for instance, a laser which generates on the object of interest a measure-indicating laser line, which can be detected with the aid of the same video camera.

The invention may of course also be used in circumstances when no depth information is required and consequently no depth information data need to be generated for the above mentioned calculating steps.

Figure 9:
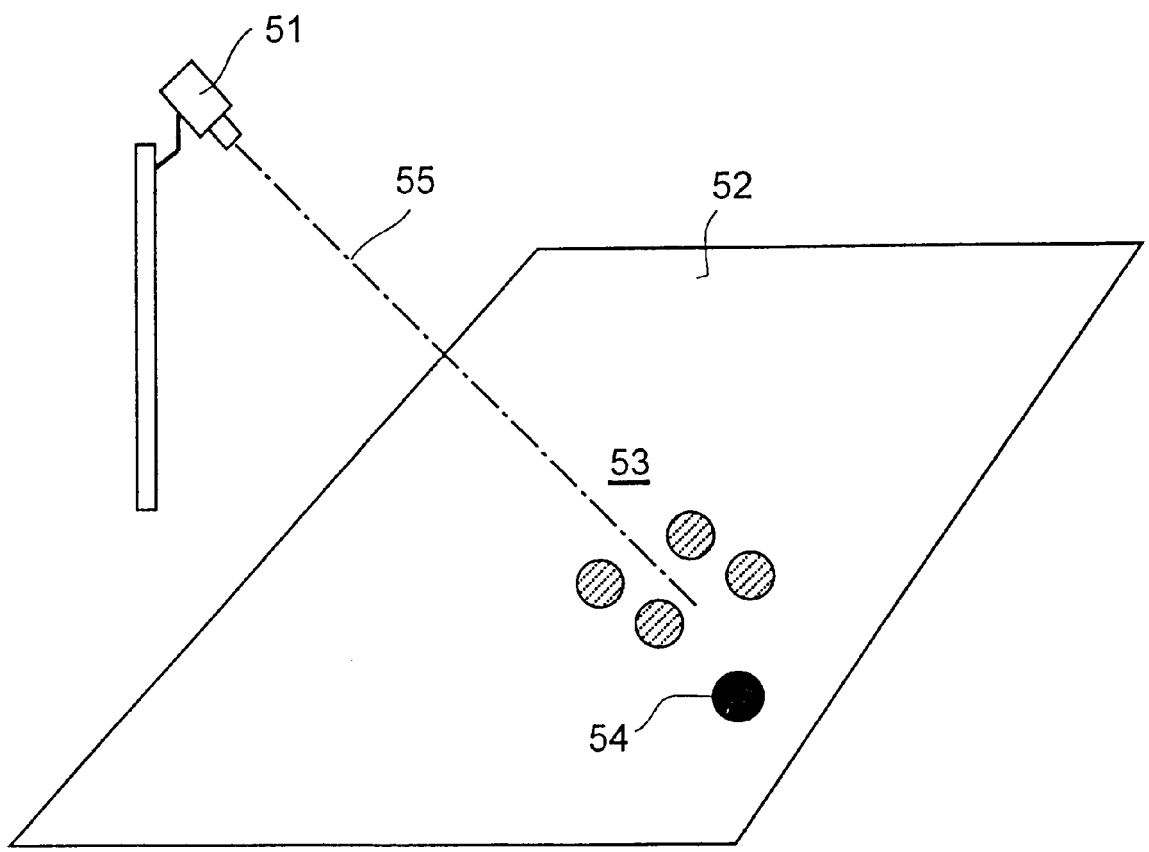
FIG. 9 shows a fundamental arrangement for recording monitoring information according to yet another example of an embodiment of the invention.

FIG. 9 shows an example of a general arrangement for recording the monitoring information according to the invention. A video camera 51 is arranged to scan an area of residence which is represented by the surface 52. Within the area of residence there are five animals, four of which are represented by shaded circles 53, and one animal is represented by a filled circle 54. In this case, it is assumed that the animal 54 has been subjected to some kind of injury that has caused a characteristic change of colour, for instance a bleeding wound.

In a first case, the device according to the invention can be used to establish that said animal actually is in the area by establishing a characteristic colour. In a second case, a rough determination of the position of the animal in the area of residence can be established as the point of intersection between an imaginary line 55 from the camera that intersects the surface of the area of residence, based on the knowledge of the momentary direction of the camera 51, the position of the camera in relation to the area of residence, and a calculated position of the centre of mass for selected pixels representing the animals in the manner as described above. The detailed course of calculation must be considered obvious to those skilled in the art and therefore is ignored in this context.

In a further case, the device according to the invention can be used to establish whether and, optionally, where an animal with a bleeding wound is to be found in the area of residence. The look-up memory unit 26 is then programmed with a look-up table defining the colour tones that apply to bleeding wounds. Otherwise, the processing of the recorded image information proceeds in the manner described above. If an injured animal is established to be within the area of residence, this information can be used to release an alarm signal.

It will be appreciated by the expert that many variations of the embodiments described above are feasible within the scope of the invention. That described above should therefore not be considered restrictive to the scope of protection of the invention.

What is claimed is:

1. A method in animal breeding for recording information on at least one animal within a defined area of residence, at least one video camera being used to record video signals including image information from the at least one animal, and at least one of monitoring and position data being extracted from the recorded image information, comprising:

analyzing the recorded image information with respect to pixel related content of at least one colour tone characteristic of the at least one animal;

examining during the act of analyzing the colour content of pixels with respect to at least one predefined colour tone volume; and calculating said data on the basis of pixels whose colour content falls within said at least one predefined colour tone volume.

2. A method according to claim 1, wherein further including:

producing RGB signals included in the video signals in digital form for pixels in an image frame of the image information;

analysing the digital RGB signals for the pixels with respect to said at least one colour tone characteristic of the at least one animal;

identifying each characteristic colour tone by applying a pertainment function, the colour content of a pixel being tested for its pertainment to said at least one predefined colour tone volume constituting at least one part of a colour tone space formed by the colour intensities of the RGB signals;

selecting pixels whose colour content falls within a colour tone volume; and calculating said data on the basis of the selected pixels.

3. A method according to claim 2, wherein each pixel, during testing for its pertainment to a colour tone volume, is given a corresponding pertainment value stating a position of the pixel in the colour tone volume to provide a measure of the degree of relationship of the pixel.

4. A method according to claim 3, wherein the number of pertainment values obtained are reduced by deriving the pertainment values, the derivation being carried out along the horizontal lines of the frame; and discriminating derivative values below a predetermined threshold value.

5. A method according to claim 3, wherein the number of pertainment values obtained is reduced by successively averaging adjoining pertainment values; and dsicriminating average values below a predetermined threshold value.

6. A method according to claim 3 including:

calculating the center of mass for the pertainment values of the selected pixels, the calculation being based on geometric positions of the pixels and their weight as represented by the associated pertainment values; and selecting the position of a portion having a characteristic colour tone in the frame to be equal to the position of the calculated centre of mass.

7. A method according to claim 2, wherein the colour analysis of the image information is carried out in dedicated hardware in which each colour tone volume is defined by a look-up table of pertainment values that are stored in a look-up memory unit;

the RGB intensity values of the pixels are supplied as address information to the look-up memory unit; and the pertainment value of a pixel is read from the memory either when the RGB address information of the pixel corresponds to an address in the look-up table or when the pertainment value zero is given to the pixel if the address is not comprised by the look-up table.

8. A method according to claim 1, wherein:

the colour analysis is carried out in real time at video frequency; and the colour analysis of a frame is carried out continuously while recording the frame.

9. A method according to claim 1, wherein the colour analysis is carried out locally within a frame and line by line of the recorded image information.

10. A method according to claim 1, wherein the colour analysis is carried out locally within a frame and comprises a number of successive lines in the image information.

11. A method according to claim 1, in which two spaced-apart video cameras are used to record the image information, wherein a further reduction of the data set is achieved by illuminating a currently monitored object with two limited light beams of different colour, one light beam including light within the red colour spectrum, while the other light beam includes light within the blue color spectrum;

wherein said light beams are directed to the object, such that the light beams are caused to intersect within an expected area of residence of the object, the area of residence being predicted on the basis of historical data regarding the object; and only pixels containing colour contributions from the two light beams are selected.

12. A method according to claim 1, for recording of monitoring information, the method including:

scanning the area of residence by using at least one video camera arranged for observing the area; and calculating a position of a characteristic colour tone within the area of residence on the basis of positions of selected pixels in a frame and the momentary direction and position of each video camera in relation to the area of residence.

13. A method according to claim 1 including:

said at least one colour tone volume is characteristic of injuries or other abnormal changes of the at least one animal; and an alarm signal is emitted on identification of such a colour tone.

14. A method according to claim 1, wherein:

the point of time for calculating position data is registered; and an alarm signal is released when said data assumes values that deviate from predetermined expected values.

15. A method according to claim 1, the method being used at a milking station for extracting position information on the teats of an animal for guiding an animal-related device and said at least one video camera being used for recording image information from an udder, wherein said method comprises:

generating digital RGB signals of the pixels in the recorded image information;

reducing the number of pixels by analysis of the RGB signals with respect to the content of colour tones which are characteristic of the colour of the teats;

employing, in said analysis, a pertainment function, the colour content of the pixels being tested for its pertainment to a limited predefined colour tone volume of teat colour tones in an RGB intensity space and being given a pertainment value corresponding to the positions of the pixels in or outside the colour tone volume;

selecting pixels having a colour tone that falls within the colour tone volume as probable teat pixels; and using the pertainment values of the selected pixels for continued processing and real time calculation of the positions of the teats.

16. A method according to claim 15, wherein:

the pertainment values of the selected pixels are derived for establishing colour tone transitions representing probable teat edges; and derivative values below a predetermined threshold value are discriminated.

17. A method according to claim 15 including:

forming average values of the pertainment values for adjoining pixels; and discriminating average values below a predetermined threshold value.

18. A method according to claim 15, wherein:

selecting pixels spaced apart by a given number of pixels along each line in the frame represented by the pertainment values;

comparing the amplitudes of a selected pair of values for establishing a probable intermediate teat edge transition;

discriminating pairs of values for which such a transition cannot be established; and repeating the procedure until a limited number of values are obtained which represent probable teat image or teat edge pixels.

19. A method according to claim 15, wherein the analysis is limited to pixels within a certain area round a teat position that has been established during a preceding frame.

20. A method according to claim 15 including:

scanning the teats from below and upwards by means of said at least one video camera; and analyzing a frame of the image information continuously while the at least one video camera is scanning the teats.

21. A method according to claim 15 including analyzing the image information locally and in line by line within a frame.

22. A method according to claim 15, wherein the image information is analysed locally and comprises a number of successive lines in a frame or field.

23. A method according to claim 15, wherein the pertainment function is implemented by a programmable look-up unit containing a look-up table which defines said colour tone volume and contains a set of pertainment values.

24. A method according to claim 23, the milking station containing means for automatically reading out the identity of the animal, wherein the method includes:

reading out the identity of the at least one animal with said means; and wherein the look-up unit is programmed in real time with a look-up table of pertainment values, which is related to the read-out identity.

25. A method according to claim 24 including preparing a unique look-up table in advance for each individual animal and storing the look-up table in a database, wherein the look-up table is collected from the database using the read-out identity information.

26. A method according to claim 24 including:

preparing in advance a look-up table of a group of individual animals having similar teat colours and storing the look-up table in a database wherein the look-up table is collected from the database using the read-out identity information of an animal belonging to the group.

27. A method according to claim 23, wherein preparing the look-up table includes:

recording at lesat one colour image of at least one set of teats of similar colour;

analyzing the at least one image with respect to its colour tones;

calculating a pertainment value for each included colour tone as a measure of the uniqueness of the colour tone for a teat image, wherein the calculated pertainment values are used to form the look-up table.

28. A method according to claim 15 including:

illuminating the teats by two light beams of different colour at a given relative angle, wherein one light beam is within the red colour spectrum and the other light beam is within the blue colour spectrum;

directing the light beams so as to intersect within an expected zone of residence for the teats, said zone of residence being predicted based on historical data;

testing the pixels for their content of the respective colour of the light beams; and selecting pixels which contain colour contributions from both light beams.

29. A method according to claim 15 including calculating the position of a teat tip based on selected pixels while using an algorithm for a centre of mass calculation, the calculation being based on the relative geometric positions of the pixels in a frame and the weight of each pixel as represented by its pertainment value.

30. A method according to claim 15 including calculating the position of a teat tip on the basis of selected pixels while using an algorithm which is based on shape factors of a type teat length/width.

31. A method according to claim 15 including calculating the position of a teat tip on the basis of selected pixels while using an algorithm which is based on the position of the udder and historical data regarding the teat positions.

32. A method according to claim 15 including:

recording the image information with two video cameras arranged in a spaced-apart relationship in the same horizontal plane and on the same side of the animal, and adapted to watch the udder obliquely from the front between the forelegs and hind legs of the animal;

analyzing the image information from the respective cameras in parallel and in corresponding manners;

calculating, for each camera, X and Y coordinates for a teat tip on the basis of selected pixels; and calculating a Z coordinate of the teat tip on the basis of the X and Y coordinates from the two cameras, the relative distance between the cameras and the direction the cameras.

33. A device in animal breeding for calculating at least one of monitoring and position data for at least one animal within a defined area of residence, using at least one video camera for recording video signals including image information from the at least one animal, said device comprising:

means for analyzing the recorded image information with respect to its pixel related content of at least one colour tone characteristic of at least one animal;

means for examining the colour content of said pixels with respect to its pertinent to at least one predefined colour tone volume; and means for calculating said data on the basis of pixels whose colour content falls within said at least one predefined colour tone volume.

34. A device according to claim 33, comprising:

signal converting means for producing in digital form RGB signals for the pixels in pictures of the image information;

a data reducing unit for reducing the amount of information in each frame by colour analysis of the pixels, comprising a pertainment function unit to which the RGB signals are supplied for testing the relationship of each pixel with a defined, animal-characteristic colour tone volume in an RGB colour intensity space and providing for every pixel a pertainment value, and means for selecting pixels having a colour tone falling within the colour tone volume;

memory means for storing the pertainment values of the selected pixels and the positions thereof in the frame;

calculating means for calculating said data on the basis of the stored information in said memory means; and means for controlling the mode of operation of the device.

35. A device according to claim 34, wherein:

the pertainment function unit includes a look-up memory (26);

the look-up memory is programmable with a look-up table containing addressable pertainment values which define said colour tone volume, the size of the pertainment value stating the degree by which a colour tone is characteristic of a colour of the animal or animals; and the look-up memory is provided with address inputs for supplying thereto the RGB signals as address information.

36. A device according to claim 34, wherein the image information contains colour fields with defined edges, wherein the data reducing unit comprises differentiating means for deriving the pertainment values of the selected pixels, said selecting means comprising a discriminator for suppressing derivatives below a threshold value and selecting pixels related to said edges.

37. A device according to claim 34, wherein:

said memory means comprises a direct access memory having double input and output ports; and said calculating means is adapted to carry out output data calculations for a frame in parallel with reading of the selected pixels in the memory means.

38. A device according to claim 34, wherein:

the data reducing unit is adapted to operate with a constant pixel delay, controllable delay means being adapted to compensate for varying consumption of time for selectable processing routines; and said calculating means is adapted to measure the calculating time used, whereby the device obtains a deterministic pixel delay, which permits correction of the calculated position data in respect of the movements of the at least one animal.

39. A device according to claim 34, wherein said calculating means is programmed to carry out a centre of mass calculation for selected pixels based on the geometric positions of the pixels and the weight thereof as represented by the associated pertainment values, the coordinates of a defined colour field in the frame being set equal to the coordinates of the centre of mass and constituting the basis for calculating said position data.

40. A device according to claim 34, provided at a milking station comprising animal-related means, which are guidable towards the teats of an animal in dependence on position information on the teats, said at least one video camera being adapted for recording image information from the teats or udder of the animal, wherein said device comprises:

signal converting means for preparing the digital RGB signals of the pixels in the recorded image information;

data reducing means for reducing the number of pixels by analysis of the RGB signals with respect to the content of teat-characteristic colour tones, comprising a pertainment function unit to which the RGB signals are supplied and which is adapted to test the colour content of the pixels for their pertainment to a limited colour tone volume, defined in advance, of teat colour tones in an RGB intensity space, and to give the pixels pertainment values in response to their positions in or outside the colour tone volume, and means for selecting pixels having a colour tone falling inside the colour tone volume;

memory means for storing the pertainment values and positions of selected pixels in a field of the image information;

calculating means for calculating the position information based on the stored information in said memory means; and means for controlling the mode of operation of the device.

41. A device according to claim 40, wherein:

the pertainment function unit is implemented by a look-up memory which is programmable with selectable look-up tables of pertainment values, each table defining a colour tone volume, and the look-up memory is provided with address inputs for receiving the RGB signals as address information and reading the corresponding pertainment values.

42. A device according to claim 41, having access to a database for storing look-up tables prepared in advance, each table corresponding to at least one animal having particular teat colours, and the milking station being provided with means for reading out the identity of the at least one animal, wherein the look-up memory is adapted, on the occasion of milking, to be programmed with the relevant look-up table which is collected from said database in dependence on the read-out identity information.

43. A device according to claim 40, wherein:

said data reducing means comprises differentiating means adapted to derive the pertainment values of selected pixels; and said selecting means comprises a discriminator adapted to suppress derivatives below a threshold value, whereby pixels related to teat edges are selected.

44. A device according to claim 40, wherein:

said memory means comprises a direct access memory having double input and output ports; and said calculating means is adapted to carry out the calculation of the position information in parallel with the current reading of pertainment value information for subsequent pixels.

45. A device according to claim 40, wherein:

said data reducing means includes a dedicated hardware, which is adapted to operate with a constant pixel delay, and which comprises controllable delay means for compensating variable consumption of time of different selectable processing procedures; and said calculating means is adapted to measure the used calculating time, whereby the processing of each field takes place with a deterministic pixel delay, which enables correction of the calculated position information with respect to the movements of the teats.

46. A device according to claim 40, wherein:

two light sources are arranged to direct light beams of different colours such that the light beams intersect within a predicted teat area; and the colour tone volume is defined to contain only colour tones having contributions from both light beams, whereby the foreground and background pixels having teat-characteristic colour tones can be discriminated.

47. A device according to claim 40, comprising a controllable robot arm for guiding said animal-related means, wherein at least one video camera is arranged on the robot arm.

48. A device according to claim 40, wherein:

two video cameras are arranged in a spaced-apart relationship in the same horizontal plane and on the same side of the animal, and are adapted to watch the udder obliquely from the front between the forelegs and hind legs of the animal; and said device for processing the video information of the cameras being doubled, whereby the image information from the respective cameras is analyzed in parallel and in corresponding manners.

* * * * *

UNITED STATES PATENT AND TRADEMARK OFFICE
CERTIFICATE OF CORRECTION

PATENT NO. : 5,979,359
DATED : NOVEMBER 9, 1999
INVENTOR(S) : JENS HANSSON

It is certified that error appears in the above-identified patent and that said Letters Patent is hereby corrected as shown below:

On the title page,

Under [30] Foreign Application Priority Data:

Add: October 27, 1995     [SE]    Sweden........................9503791

Signed and Sealed this

Twenty-third Day of May, 2000

Attest:

Q. TODD DICKINSON

*Attesting Officer*      *Director of Patents and Trademarks*